BUNDY & EDGERTON.
Corn Sheller.

No. 32,273.                                         Patented May 14, 1861.

UNITED STATES PATENT OFFICE.

L. S. BUNDY AND L. F. EDGERTON, OF HYDE PARK, VERMONT.

CORN-SHELLER.

Specification of Letters Patent No. 32,273, dated May 14, 1861.

*To all whom it may concern:*

Be it known that we, LORIN S. BUNDY and LEVI F. EDGERTON, both of Hyde Park, Lamoille county, Vermont, have invented a new and useful Improvement in Corn-Shellers; and we hereby declare the following to be a full, clear, and exact description thereof, reference being had to the accompanying drawings, forming part of this specification, and in which—

Figure 1:
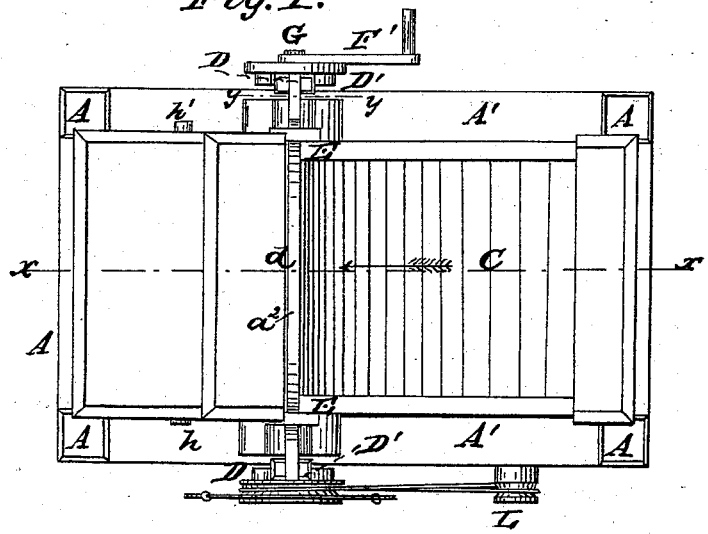
Figure 2:
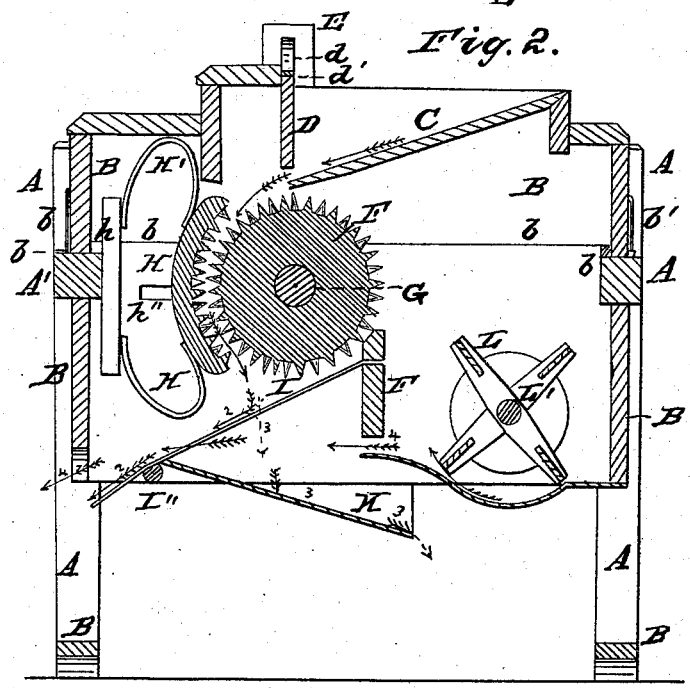
Figure 3:
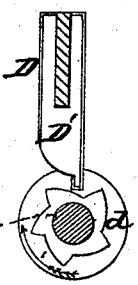

Figure 1, represents a plan view of the machine; Fig. 2, a vertical section on line $x, x$, of Fig. 1, and Fig. 3, a detached, sectional view on line $y, y$, of Fig. 1, hereinafter more fully explained.

To enable others skilled in the art to make and use our invention we will proceed to describe its construction and operation.

The frame of the machine consists of four posts A, A, A, A, and cross pieces A', A', A', A', to which, the sides B, B, B, are secured.

The upper part of the machine is made so that it may be taken off for inspection of the parts inside should they get out of order, the line $b$, in Fig. 2, showing the place of separation; and it is held firmly in position, when in operation, by hook and staple $b', b'$.

C, is the feed table or chute; D, a "feeder" secured in uprights D', which rest on cogs $d, d$, revolving with the axle in direction of arrow 1, thus—the feeder is raised by the cogs $d, d$, and kept down by spring $d'$, (secured at $d''$, to the feeder) playing into two uprights E, E, fastened to the sides B, B, of the machine.

F, is a revolving cylinder, operated by a crank F', on the end of the axle G, and is provided with pointed teeth running diagonally around it. This cylinder and its teeth are iron and all cast together.

H, is the concave opposite the cylinder F, provided with teeth similar to those on the cylinder. Four springs H', H', (fastened at one end to an upright $h$, which is secured to the cross piece A', and at the other to the concave H,) give the concave free play in all directions, to fit the shape of any ear of corn. The concave is held in position by iron pins or journals $h', h'$, passing through slots $h'', h''$, in the sides B', of the machine, allowing the concave the required play. The concave, its teeth and journals may be cast together and of iron.

I, is the separator consisting of a series of wires of any desired size, on which the cob drops and passes out on the end opposite the feed table.

The wires, composing the separator may be fastened to cross pieces I, and I'', as shown.

K, is an inclined chute or table, onto which, the shelled corn drops and is carried off.

L, is a fan, designed to clean the corn before it is dropped onto the chute K, and motion is communicated thereto by a band $l$, passing around the end of the axle L', and thence around a pulley on the end of axle G.

The operation is as follows: The ears of corn are fed onto the table so that their sides will be presented to the feeder D. On turning the crank F', said feeder will rise high enough, as before explained, to allow one ear of corn to pass over the cylinder at a time and four ears are shelled at one revolution of the cylinder, the springs H', H', and slot $h''$, allowing the concave H, to recede from the cylinder F, far enough to admit the ear and hold it closely between them. The corn will be separated from the cob in this operation and the latter will drop onto the separator I, and pass off in the direction of arrows 2; the former will drop through the space between the wires and onto the chute K, and so off, into a receptacle placed therefor in the direction of dotted arrows 3. While the corn is in the act of dropping the blast of air from the fan L, in direction of arrows 4, will blow off any impurities which might otherwise fall in with the corn.

Instead of the crank F, a small wheel may be attached to arbor or end of the shaft of cylinder and run inside of a large gear wheel attached or journaled to the side of the machine, and having a crank pin or handle on its outer side.

The machine can be driven by water, horse or steam power as required, the power being applied in any convenient manner.

Having thus described the construction and operation of our improved corn sheller, what we claim as our improvement and desire to secure by Letters Patent, is—

The construction and arrangement of the feeder D, spring $d'$ uprights D', and E, with cogs $d$, as and for the purposes set forth.

In witness whereof we hereunto subscribe our names.

LORIN S. BUNDY.
LEVI F. EDGERTON.

In presence of—
H. N. POWERS,
M. G. BUNDY.